Dec. 22, 1964   R. L. DIETERT   3,161,927
METHOD AND APPARATUS FOR TAKING A MEASUREMENT
OF COMPENSATED MOISTURE CONTENT
OF GRANULAR MATERIAL
Filed Oct. 12, 1959   6 Sheets-Sheet 1

INVENTOR.
RANDOLPH L. DIETERT
BY Whittemore,
Hulbert & Belknap
ATTORNEYS

Dec. 22, 1964    R. L. DIETERT    3,161,927
METHOD AND APPARATUS FOR TAKING A MEASUREMENT
OF COMPENSATED MOISTURE CONTENT
OF GRANULAR MATERIAL
Filed Oct. 12, 1959    6 Sheets-Sheet 2
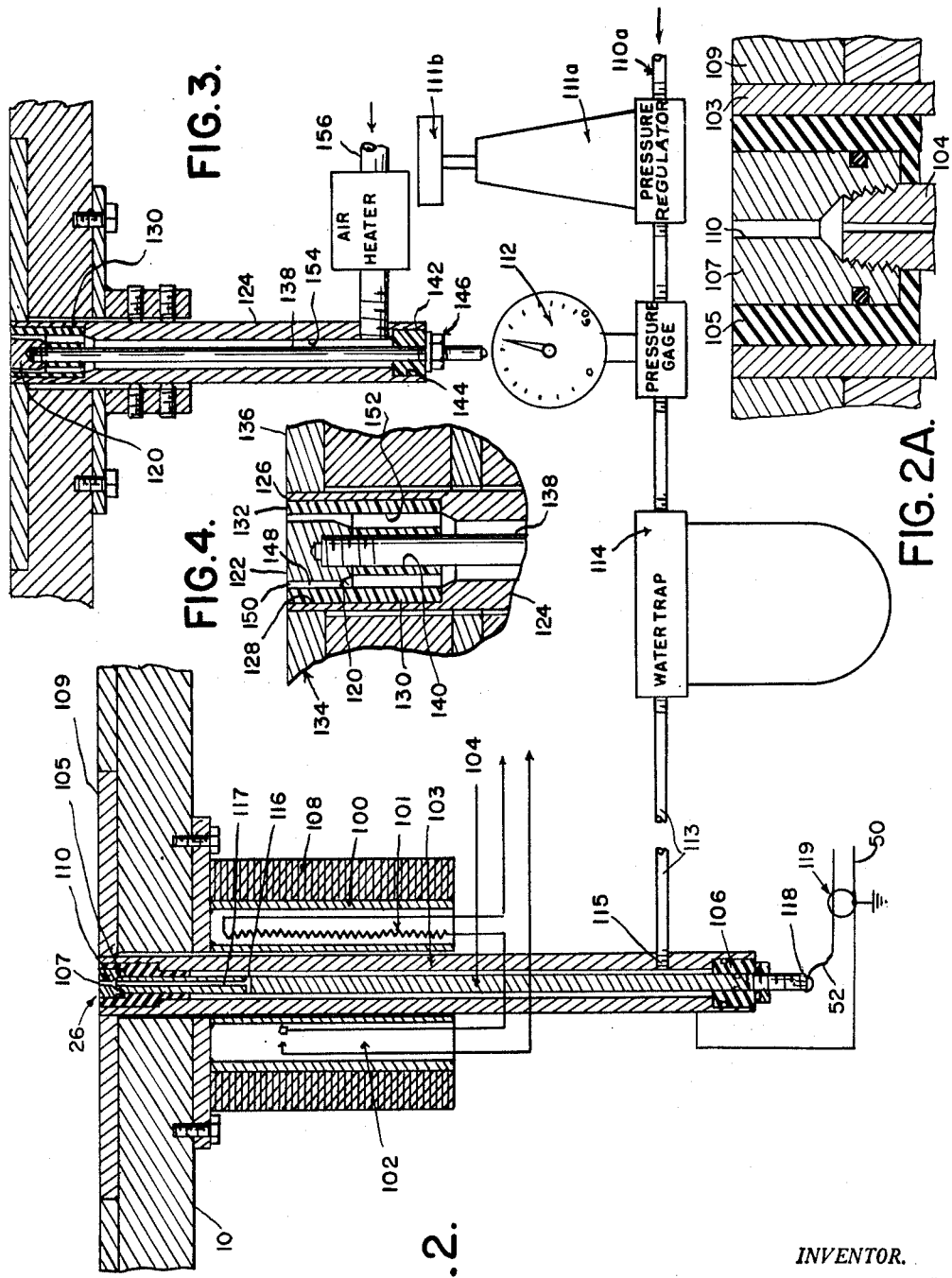
INVENTOR.
RANDOLPH L. DIETERT
BY Whittemore,
Hulbert & Belknap
ATTORNEYS Dec. 22, 1964
R. L. DIETERT
3,161,927
METHOD AND APPARATUS FOR TAKING A MEASUREMENT
OF COMPENSATED MOISTURE CONTENT
OF GRANULAR MATERIAL
Filed Oct. 12, 1959
6 Sheets-Sheet 3
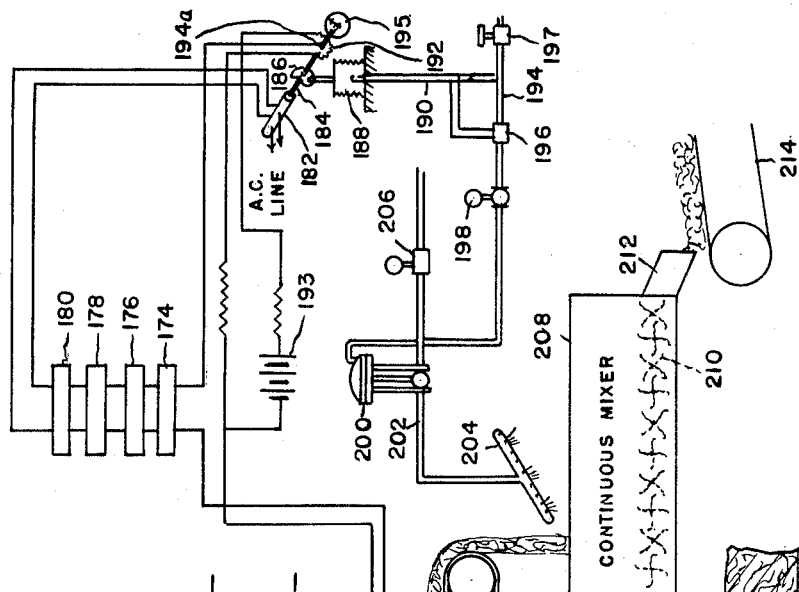
FIG. 5.
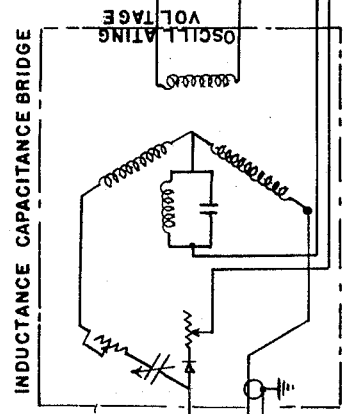
FIG. 6A.
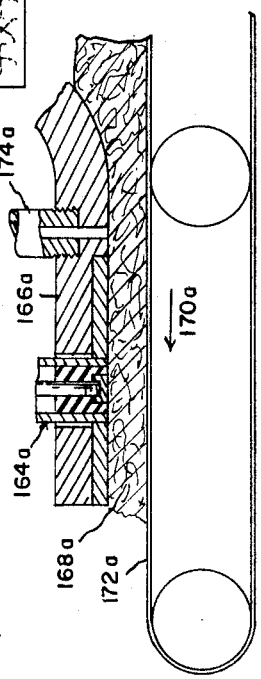
FIG. 6.
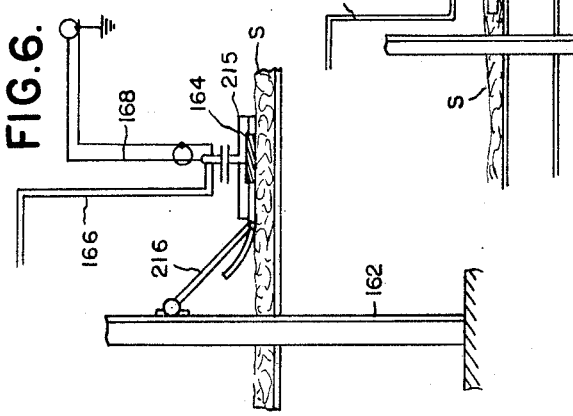
INVENTOR.
RANDOLPH L. DIETERT
BY Whittemore,
Hulbert & Belknap
ATTORNEYS Dec. 22, 1964     R. L. DIETERT     3,161,927
METHOD AND APPARATUS FOR TAKING A MEASUREMENT
OF COMPENSATED MOISTURE CONTENT
OF GRANULAR MATERIAL
Filed Oct. 12, 1959     6 Sheets-Sheet 4
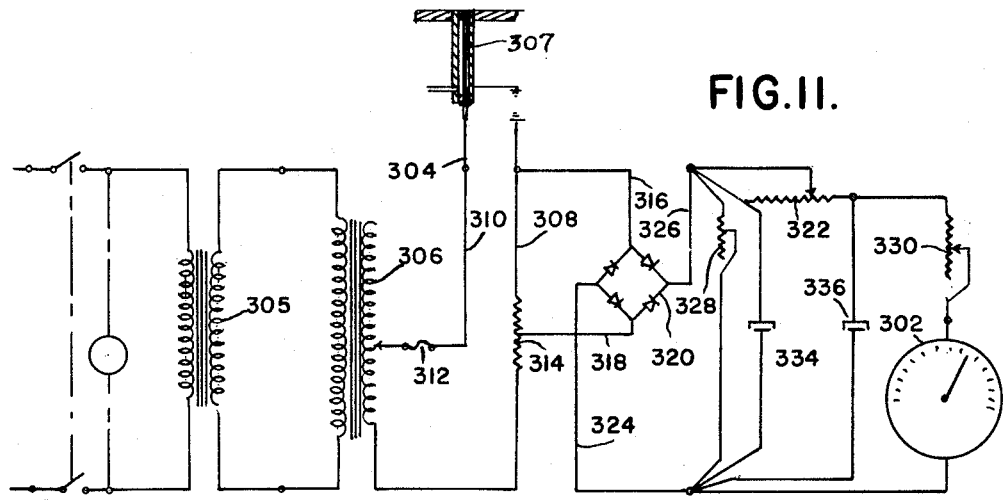
FIG. 11.
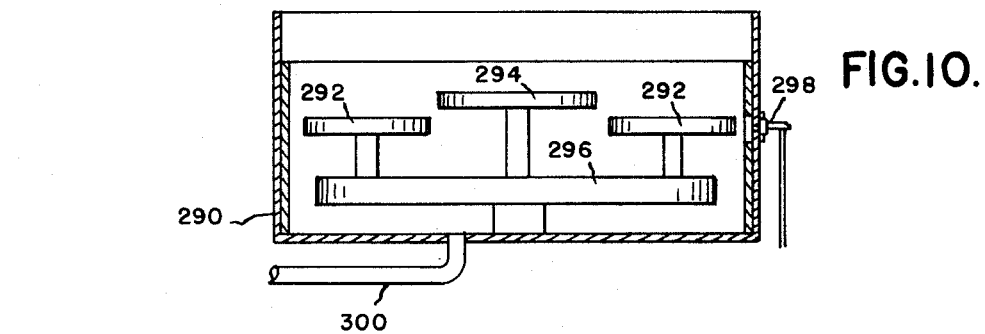
FIG. 10.
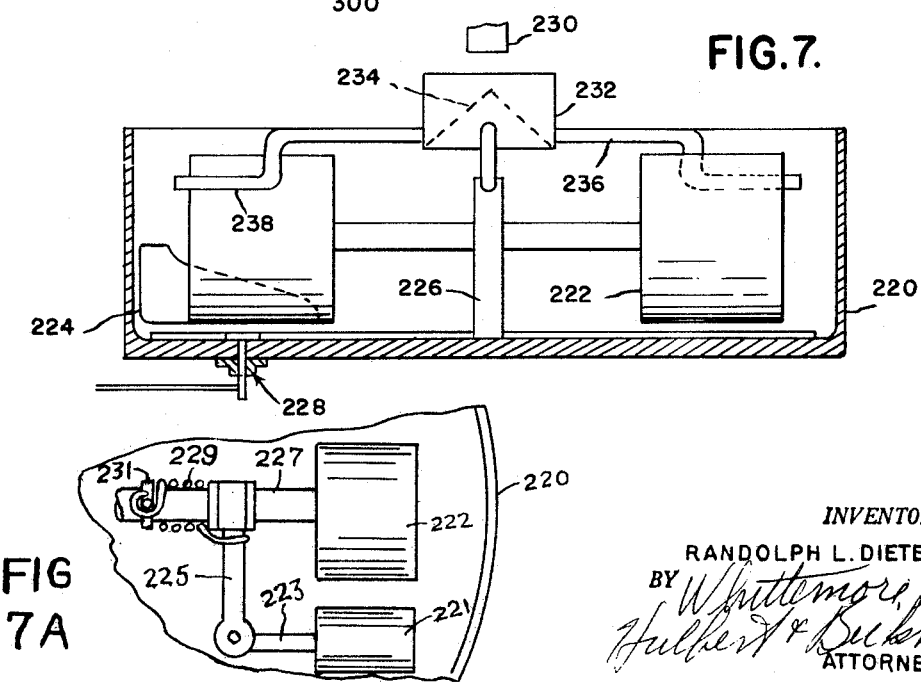
FIG. 7.
FIG 7A
INVENTOR.
RANDOLPH L. DIETERT
BY
ATTORNEYS

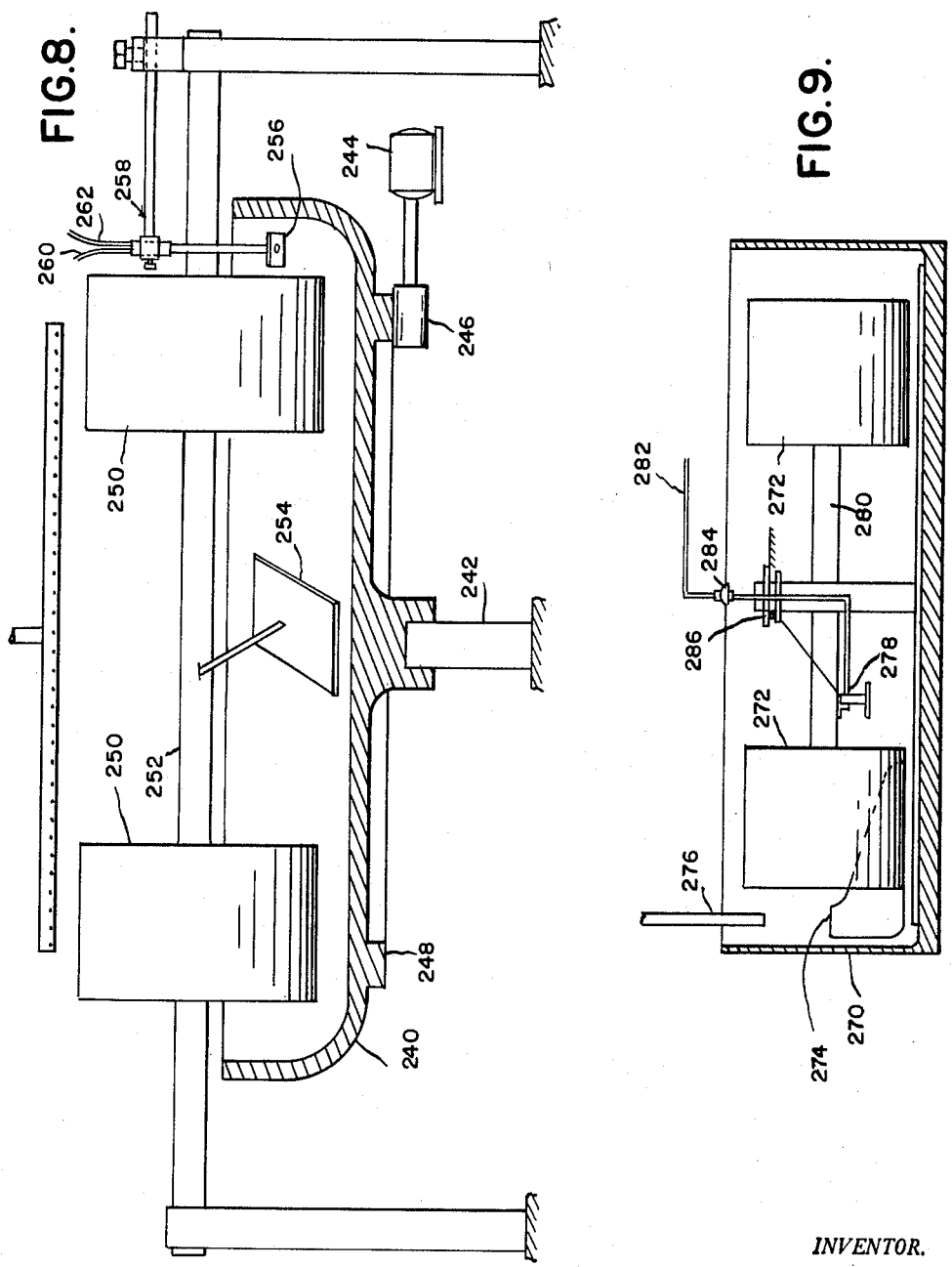

Dec. 22, 1964 R. L. DIETERT 3,161,927
METHOD AND APPARATUS FOR TAKING A MEASUREMENT
OF COMPENSATED MOISTURE CONTENT
OF GRANULAR MATERIAL
Filed Oct. 12, 1959 6 Sheets-Sheet 6

INVENTOR.
RANDOLPH L. DIETERT
BY Whittemore,
Hulbert & Belknap
ATTORNEYS

United States Patent Office 3,161,927
Patented Dec. 22, 1964

3,161,927
METHOD AND APPARATUS FOR TAKING A MEASUREMENT OF COMPENSATED MOISTURE CONTENT OF GRANULAR MATERIAL
Randolph L. Dietert, Detroit, Mich., assignor to Harry W. Dietert Co., Detroit, Mich., a corporation of Michigan
Filed Oct. 12, 1959, Ser. No. 845,727
8 Claims. (Cl. 22—89)

The present invention relates to method and apparatus for taking a measurement of compensated moisture content of granular or comminuted material such for example as foundry sand, and either indicating this measurement or using it as a control factor in the addition of water to the material.

While the invention is capable of use with many different materials, a typical use in conjunction with foundry sand will be described in detail.

Foundry sand is tempered by the controlled addition of water and working of the sand such as by the use of rollers, to bring it to the proper consistency for use in forming molds for casting. Originally, a condition of the sand was tested by the skilled artisan who could determine from the feel of the sand its approximate condition. Today, more accurate results are obtained by actual measurement of the moisture content of the sand. However, it is customary to measure the moisture content of the sand either at the batch hopper, conveyor, or at a mill in which the sand is mixed, so that in all cases there is at least some loss of moisture during the interval following mixing and measuring before which the sand is actually used in the foundry. One factor which has a very substantial effect on the loss of moisture from the sand between mixing and use is the actual temperature of the sand. Other factors are of course the time during which the moist sand is subjected to moisture loss before it is used, and the temperature and humidity of the room air in the foundry.

In accordance with the present invention a measurement of a small specimen of sand within a larger vessel, such for example as a batch hopper, conveyor, or mixer, is subjected to a predetermined drying action after which its instantaneous moisture content is measured. The loss of moisture by the controlled brief drying of the specimen will bear a direct relationship to the moisture which the sand will lose during the interval between mixing and use.

The measurement of the compensated moisture content is made by instruments measuring an electrical condition existing across a pair of spaced electrodes. This electrical condition may be capacitance, voltage, or other conditions. Since both the capacitance and/or resistance existing between a pair of spaced electrodes exposed to a moist granular material is a function of its moisture content, the probe constituted by the electrodes will be sensitive to the moisture content of the sand in the container reduced by the expected or anticipated loss of moisture during the interval between mixing and use.

The controlled drying of the small portion of sand in direct proximity to the spaced electrodes is effected by a substantial flow of air which will exert a drying action on the sand dependent upon the volume and temperature of the air, the temperature of the sand, and the character of the sand as to particle size, clay inclusion, etc. Preferably, the air is emitted through an orifice located in the general plane of the specimen contacting surfaces of the electrodes and is caused by the presence of the bulk of sand overlying the electrodes to move across the electrodes and through that portion of the sand in closer proximity to the electrodes.

With the foregoing general statements in mind, it is an object of the present invention to provide a method and apparatus for measuring a compensated moisture content of moist granular material.

It is a further object of the present invention to employ the measurement obtained in accordance with the preceding paragraph to operate an indicator or to control automatic mechanism for adding water to the granular material.

It is a further object of the present invention to provide a method and apparatus in which drying air is passed for a controlled interval through a specimen of moist sand to reduce its moisture content as measured by the variable electrical condition across a pair of spaced electrodes.

More specifically, it is an object of the present invention to provide a method and apparatus in which air is caused to flow continuously across the surface of a probe including spaced electrodes so as to exert a drying effect on moist granular material in contact therewith.

Other objects and features of the invention will become apparent as the description proceeds, especially when taken in conjunction with the accompanying drawings, illustrating preferred embodiments of the invention, wherein:

FIGURE 2 is a sectional view through a probe illustrating air connections thereto.

FIGURE 2a is a longitudinal sectional view of a modified probe.

FIGURE 3 is a longitudinal sectional view through a somewhat different probe.

FIGURE 4 is an enlargement of a portion of FIGURE 3.

FIGURE 5 is a diagrammatic view including a wiring diagram showing an application of the present invention to granular material advancing on a conveyor.

FIGURE 6 is a fragmentary schematic view showing a variation of the probe support illustrated in FIGURE 5.

FIGURE 6A is a sectional view through a modified form of probe.

FIGURE 7 is a schematic section view showing the application of the invention to a particular mill.

FIGURE 7A is a fragmentary plan view of the structure shown in FIGURE 7, illustrating a pre-compression roller.

FIGURES 8–10 are schematic sectional views showing the application of the invention to different types of mills.

FIGURE 11 is a wiring diagram showing a system for indicating the measurement of compensated moisture.

Figure 1:
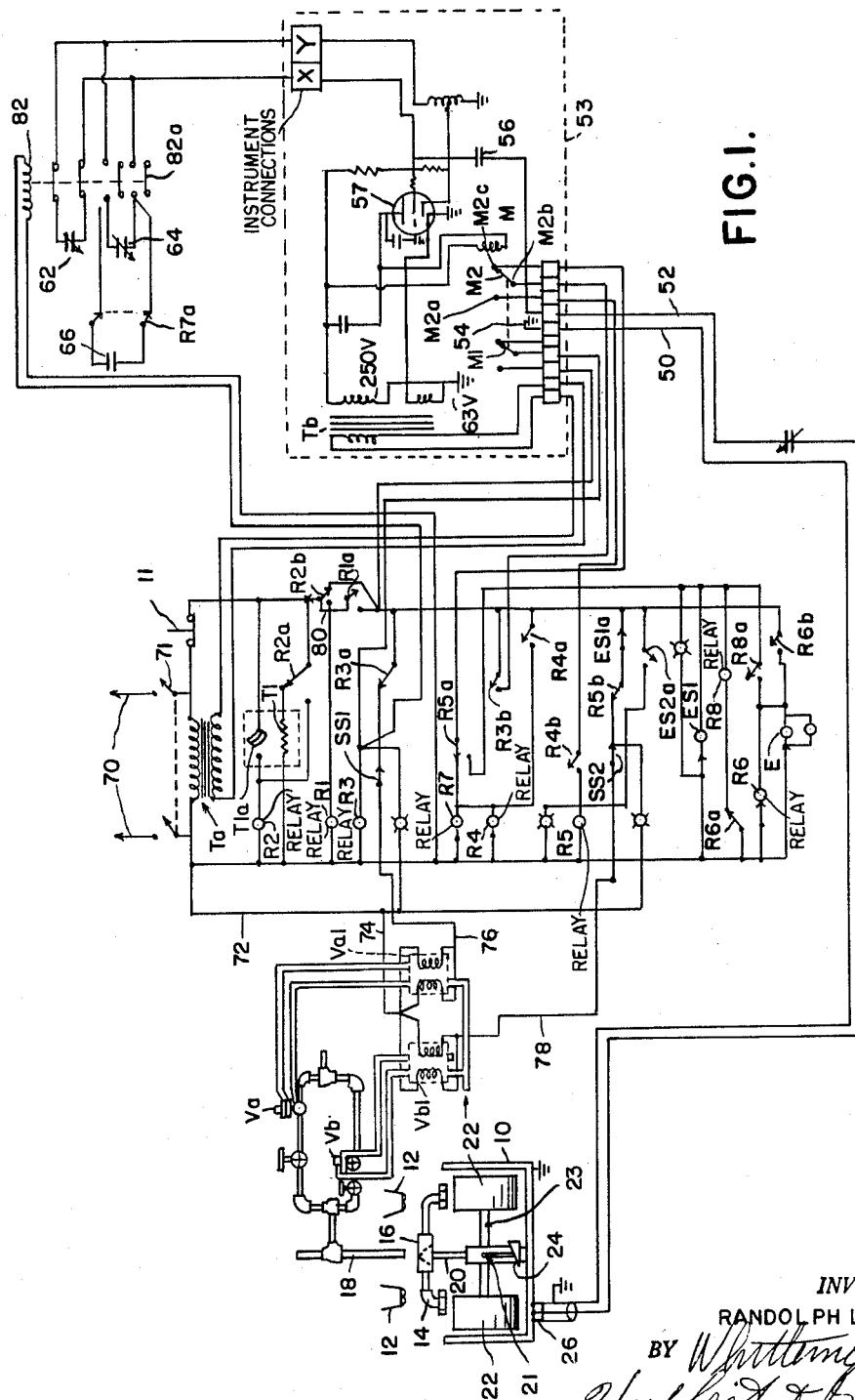
FIGURE 1 is a diagrammatic view including a wiring diagram showing the operation of the present invention in the automatic control of the addition of water to granular material.

As seen in FIGURE 1, there is provided a sand mill or mixer 10 adapted to receive sand from one or a plurality of hoppers 12, and water is added to the sand in the mill through springlers 14 connected to a receptacle 16 which receives water from a pipe 18. The sprinklers are illustrated as supported by a vertical shaft 20 which serves as drive means for the relatively heavy rollers 22.

In FIGURE 1 the sprinklers 14 appear as directly above the rollers 22, but in practice they are preferably circumferentially spaced therefrom.

The sand mill 10 is of the type including the relatively heavy rollers previously referred to, and in addition to the rollers there is provided a plow or plows 24 having a leading edge spaced only slightly above the bottom wall of the mill and adapted to scrape the sand therefrom after it has been compacted by the rollers 22.

Located in the bottom wall of the mill is a moisture probe 26 which includes a conducting element separated by a predetermined distance from grounded conducting elements. A probe of this type is disclosed in detail in FIGURE 2 and will be subsequently described. For the present it is sufficient to note that it senses an electrical capacitance between spaced electrodes in contact with the sand.

As the heavy rollers pass over the probe a specimen of moist sand is firmly compressed against the conducting plate or element of the probe and a maximum moisture reading is thus obtained. After the reading has been obtained the compressed specimen is removed from the probe by the succeeding plow 24. Actually, while the plow does not contact the bottom wall of the mill nor engage the moisture sensitive surface of the probe, the plow is effective to remove all or substantially all of the compressed material from the surface of the probe.

The moisture probe 26 is connected by lines 50 and 52 to a moisture measuring bridge indicated at 53 which is a measuring instrument identified as a modified Tektor Unit #101, manufactured and sold by the Fielden Instrument Division of the Robertshaw-Fulton Control Company. It should also be understood that in place of a "Fielden Unit," a "MEK" manufactured by Machinery Electrification, Inc., may be used, or as far as that goes, any modified inductance capacitance bridge. The line 50 represents a grounded shielding for the conductor 52, the ground connection being indicated at 54. The line 52 is connected through a high capacity capacitor 56 to instrument connector X.

The instrument connection X is connected to the grid of a vacuum tube 57, for example a 6SN7 tube, connected as shown to have its output applied to a relay coil M which actuates switch contact arms M1 and M2. Also connected to the instrument connections are an adjustable first point capacitor 62 and an adjustable end point capacitor 64. The end point capacitor 64 is connected in parallel with a high capacity, as for example 2000 mfd., fixed capacitor 66, by normally closed contacts R7a of a relay R7 later to be described.

With reference to FIGURE 1, the mill frame 10 is stationary and rigid. Underneath the mill is a motor and gear box (not shown) which drives or rotates the vertical shaft 21 which, in turn, causes horizontal shaft 23, wheel 22, and plow 24 to revolve circumferentially within the mill. The initial starting of the mill is by a manual motor starter switch (not shown). The release of the clams or dump doors of the batch hopper may be done manually to dump the sand into the mill where mixing operations are applied.

It is ordinarily desirable to allow substantial mixing of the sand before attempting to determine its moisture, since sand of different moisture content may be dumped into the mill from different hoppers.

After a predetermined interval of mixing, operation of the moisture control device is initiated and water is added through the pipe 18. A timer is started which will insure rechecking the moisture content after a predetermined interval even though the instrument may previously have indicated sufficient moisture. This is because of the loss of moisture due to evaporation during the mixing or the possibility of a false reading and rechecking after a predetermined interval will insure continued operation of the instrument until the average moisture content of the mixture is adequate.

During operation of the instrument, a first point valve $Va$ and an end point valve $Vb$ are both opened and water is supplied to the sand while it continues to be mixed. Inasmuch as the mixing operation comprises the passing of the rollers 22 over the moisture probe 26, followed almost immediately by passage of the plow 24, it will be appreciated that even when the sand reaches the required moisture content, this correct moisture content will be indicated only at intervals determined by the passage of the rollers 22 over the probe. After the scraper or plow 24 has passed over the probe, the sensing system will indicate a moisture deficiency until the succeeding sample of moist sand is compressed against the probe.

At this time it is desired to add the water rapidly to bring the moisture content approximately up to but definitely somewhat below the desired value. Accordingly, at this time control of the instrument is by the first point capacitor 62. Eventually, the instrument senses the proper moisture content for a brief interval and the system is arranged at this time to close the large capacity first point valve $Va$ and to shift control of the instrument to the combination of the end point capacitance 64, and the modifying capacitance 66. Capacitance 66 is a large value capacitance, for example 2000 mfd., which is sufficient to start the 6SN7 tube to oscillate and in turn de-energize the relay M causing contact M2 to connect contact M2b to contact M2c and complete a circuit through contact R5a to energize relays R7 and R4, thus taking capacitance 66 out of the circuit at contact R7a for the remainder of the cycle, leaving the control of the instrument to the sum of the end point capacitance 64. Thereafter, water continues to be added to the mill at a reduced rate by the end point valve $Vb$ until the first indication of the ultimate desired moisture is obtained. It is recognized however, that this first indication may be a false indication resulting from sensing the moisture content of a small specimen not indicative of the true average moisture content of the sand. Accordingly, means are provided at this time to close the end point valve while the mixing of the sand continues. During the following interval moisture readings are taken periodically as the rollers 22 pass over the sand probe. So long as these moisture readings all indicate sufficient moisture the valve $Vb$ remains closed. A timing means is provided to operate over for example three seconds, which prevents opening of the end point valve during the brief intervals between successive sensing operations. For example, re-sensing may occur every two seconds and the timer may be set to time out in three sconds. At the end of two seconds if the sensing of moisture indicates sufficient moisture, the timer is reset to zero.

On the other hand, if during this rechecking interval a moisture sensing operation indicates insufficient moisture, the moisture valve opens and remains open until a second sensing of adequate moisture. This operation continues for an interval determined by an additional timer which operates to terminate the rechecking operation and to maintain the end point valve $Vb$ closed, thus ending the cycle.

Oscillation of the 6SN7 tube is dependent upon the alegbraic sum of the capacities connected to the instrument connections X and Y.

The addition of water through the discharge pipe 18 is through a first point valve $Va$ which is air controlled and the supply of air controlling the valve is in turn controlled by an air valve having a winding $Va1$ which will will subsequently be described. At the same time an end point valve $Vb$ is provided also controlled by air, which in turn is controlled by an air valve having a winding or solenoid $Vb1$. The arrangement is such that when the solenoids $Va1$ and $Vb1$ are energized the corresponding valves are closed. The valves of course are open when the respective windings are de-energized.

The operation of the complete system will be descrbed in connection with the illustrated circuit, which will be described to the extent necessary to understand the system. A 110-volt power line indicated at 70 is connected to the control circuit through a manual control switch 71. The control circuit includes the transformer $Ta$ which is energized whenever the manual switch 71 is closed and which in turn supplies the primary of a second transformer $Tb$ having the 250-volt and 6.3-volt secondary windings illustrated in the Tektor unit 53.

The sand is dumped into the mill 10 without regard to the moisture content thereof. Where sand is dumped in from a plurality of hoppers, some of the sand may be relatively moist and some of it may be relatively dry. Accordingly, the sand which initially contacts the probe may be either too dry or too moist. In order to insure that this condition does not prevent the required addition of water, the control circuit includes timing means operable to provide a cycling of the control system after a predetermined interval irrespective of whether or not the instrument initially cut off the supply of water during the first timed interval. This means comprises a timer resistance TI having a switch arm TIa associated therewith. The switch arm TIa may for example be in the form of a bimetal contact member which is normally open and which closes after the resistance TI has been energized for a substantial period, as for example fifteen seconds. A momentary opening and closing of the manual push button switch 11 starts heating resistance element TI through contact R2a, the contact being in the illustrated position when the relay R2 is de-energized.

After the predetermined initial period, as for example fifteen seconds, has elapsed, the switch arm TIa closes energizing relay R2 and moving relay arm R2a to its lower position establishing a holding circuit through the relay R2 and simultaneously de-energizing the timer TI. The relay R2 remains energized for the remainder of the cycle. In addition, energization of relay R2 shifts relay arm R2b to the left energizing relay R1. Energization of relay R1 shifts relay arm R1a to the left establishing a connection to the lower portion of the circuit through the jumper line 80, around arm R2b, which remains to the left, holding relay R1 in. This begins the second phase of the cycle in which, if necessary, water will be added to the sand in the mill through both valves Va and Vb.

During the interval measured by the timer TI it may be possible for sufficient water to have been added to the sand and mixed therewith, in which case the operation should be terminated. In other cases a false signal may result in closure of the valves Va and Vb. When the timer TI times out the switch arm R2b moves clockwise, thus momentarily breaking the circuit to the lower portion of the system. When the switch arm R2b is in its lowermost or clockwise rotated position it energizes relay R1 which closes a circuit through switch arm R1a, thus re-energizing the lower portion of the circuit. The interval between energization of relay R2 and the energization of relay R1 is substantial and all circuits completed through portions of the wiring diagram below relay R1 in the Figure are de-energized so that all holding circuits drop out. When the switch arm R1a completes its movement all circuits are again-re-energized and checking of the moisture of the sand is resumed. If in fact, the moisture content of the sand is sufficient this recheck results in quick cycling of the instrument to close the valves Va and Vb and they will remain closed for an interval determined by energization of a timer ES2 later to be described, which finally completes the cycle.

The operation of the system during the interval controlled by the timer TI is exactly the same as it would be if the timer were omitted. The function of the timer is to re-start the complete cycle after a predetermined interval so that additional water can be added if the operation of the system was terminated as a result of a false signal during the first timed interval. A second important function of the initial timing period depends upon the following: It may happen that during the initial timing period a first signal is received from the moisture measuring unit which will have the effect of closing the large capacity valve Va and leaving additional water to be supplied through the relatively smaller end point valve Vb. If the false signal was the result of a small quantity of very moist sand happening to contact the moisture probe, a large volume of water may in fact be required to bring the average moisture content of the sand to the required value. During the initial interval timed by the timer TI, water will be added through the small capacity valve Vb. However, when the timer TI times out the control circuit is completely de-energized and re-energized, thus starting afresh with the large capacity valve Va open and this valve will remain open until the measuring unit makes the first signal indicating adequate moisture, which signal is sometimes referred to as a wet signal.

Assuming that insufficient water has been added to the sand, the rollers and plows continue to rotate and water is now added to the mill through the valves Va and Vb. The solenoid Va1 of the first water valve Va is energized through lines 72, 74, 76, selector switch SS1, switch arm R3a, switch arm R1a, and jumper 80. Energization of solenoid Va1 maintains the first point valve Va open. In like manner, the end point valve Vb and solenoid Vb1 of its air valve are energized through lines 72, 74, 78, selector switch SS2, switch arm R5b, switch arm ES1a, switch arm R1a, and jumper 80. The addition of water and mixing of the sand continues concurrently until the moisture content of the sand approaches a value near to but definitely below the final required value. At this time the value of the capacitance of the moist sand as sensed by the moisture probe 26 is such that the various capacitances connected to the points X, Y, including the first point capacitance, operate to cause the 6SN7 tube 57 to stop oscillating, thereby establishing a current through the relay coil M sufficient to shift the contacts M1 and M2 to the left from the position shown.

Closure of the switch M1 establishes a current through relay R3, switch arm R1a, and jumper 80. Energization of the relay R3 moves switch arm R3a downwardly from the illustrated position, thus breaking the circuit through the solenoid valve Va1 and closing the first point valve Va. Switch arm R3a completes a circuit through the relay R3 and through the solenoid 82 of a switch having contacts indicated generally at 82a. Energization of solenoid 82 moves the switch contacts 82a upwardly, thus disconnecting the first point capacitance 62 and connecting the end point capacitance 64 and the bias capacitance 66 into the circuit. It will be observed that the circuit through the relay R3 is held closed by the switch arm R3a, and hence from this time to the end of the cycle, relays R1, R2 and R3 remain closed.

In addition to the foregoing, energization of the relay R3 shifts the switch arm R3b downwardly, thus preparing a circuit for subsequent energization of relay R5. This circuit extends from the switch arm R4b which is open at this time, to contact M2a, contact M2b, switch arm R3b, switch arm R1a, and jumper 80.

Since this first indication of adequate moisture was based upon control of the first point capacitance 62, subsequent passages of the rollers over the moisture probe will not result in indication of adequate moisture until a substantial additional quantity of water has been added through the valve Vb. Ordinarily, it is preferred to add approximately 80% of the water while the first point valve Va remains open, the additional 20% being added at a much slower rate through the smaller end point valve Vb.

As soon as the scraper has removed the moist specimen of sand from the moisture probe following this first indication, relay coil M is de-energized and contacts M1 and M2 again return to the illustrated position to the right. At this time a circuit is completed through relays R4 and R7, the normally closed switch arm R5a, contact M2c, contact M2b, switch arm R3b which is closed by first energization of the relay M, switch arm R1a, and jumper 80. Energization of the relay R4 closes switch R4a establishing a holding circuit for the relays R4 and R7 which keeps these relays in throughout the balance of the cycle. Energization of the relay R7 opens normally closed contacts R7a, thus disconnecting bias capacitance 66 from the circuit and leaving the end point capacitance 64 in control. The operations are continuous without further change until there is a second indication of adequate moisture, which as before energizes the relay coil M and shifts the contacts M1 and M2 to the left. The contact M1 has no further function since it has already energized relay R3 which remains energized through a holding circuit throughout the balance of the cycle. However, movement of the switch arm M2 to connect contacts M2a and M2b now energizes relay R5 through switch arm R4b, contacts M2a, M2b, switch arm R3b, switch arm R1a, and jumper 80. Energization of relay R5 shifts switch arm R5b to the lower position, thus breaking the circuit to the solenoid Vb1 and closing the end point valve Vb. This would normally constitute the end of the cycle but additional provision is made for rechecking the moisture content a number of times to insure against premature termination of the cycle while the average moisture content of the sand is below that required.

The brief interval in which the switch arms M1 and M2 are to the left (before the next succeeding passage of the plow 24) has closed the end point valve Vb but downward movement of switch arm R5b has established a holding circuit through the relay R5 which includes switch arm ES1a of a short interval timer ES1. Thus, as long as the switch arm ES1a remains closed the relay R5 will remain energized and the end point valve Vb will remain closed. The motor of the timer ES1 is at this time energized through the switch arm R5a, contacts M2c and M2b, switch arm R3b, switch arm R1a, and jumper 80. The timer ES1 may be set for an interval, for example of three seconds, and after three seconds the switch arm ES1a will open if the timer is permitted to run its course. However, during the three seconds in which the timer ES1 is timing out, there will be a subsequent sensing of moisture content and if the moisture content of the sand is adequate, relay M is momentarily energized and switch arm M2 will interconnect contacts M2a and M2b briefly, and then return to interconnect contacts M2b and M2c. This will have the effect of breaking the circuit to the motor of timer ES1 at the contact M2c and return of the switch arm M2 to the contact M2c will restart the timer for timing out the same interval. Thus, so long as the periodic moisture sensing operations sense adequate moisture, the timer will be automatically re-started so that the timer contact arm ES1a will never open and the relay R5 will remain energized through the switch arm R5b, switch arm ES1a, switch arm R1a, and jumper 80. This will interrupt the circuit through the solenoid Vb1 at switch arm R5b and the end point valve will remain closed. If however, passage of a roller 22 over the moisture probe gives a dry signal, there will be sufficient time for the timer ES1 to time out, causing opening of the timer switch arm ES1a and breaking the circuit to the relay R5, thus restoring switch arm R5b to its illustrated position. This will complete the circuit through the solenoid Vb1 and re-open the end point valve Vb. The end point valve Vb will remain open until a subsequent sensing of moisture content indicates the correct value thereof at which time the end point control valve will close and re-checking will resume. The timer motor ES1 is re-started and switch arm ES1a closed when the relay R5 is next energized by the next wet signal.

In order to terminate the cycle after a predetermined interval which may be devoted to rechecking, a longer interval timer ES2 is provided having contacts ES2a in a branch circuit connecting the relay R5 across the lines. Thus, when the switch arm ES2a is closed, the relay R5 remains energized, switch arm R5b remains in its lower position, thus interrupting the circuit to the solenoid Vb1 and finally terminating the cycle.

Energization of a longer interval timer which finally terminates the cycle is initiated through normally closed switch arm R6a, relay R8, switch arm R5a, contact M2c, contact M2b, switch arm R3b, switch arm R1a, and jumper 80. Energization of the relay R8 closes switch arm R8a, thus energizing the relay R6 which in turn closes switch arm R6b, establishing a holding circuit through relay R6 and opening switch arm R6a. The continued energization of relay R6 and closure of switch arm R6b maintains the motor of timer ES2 energized for a predetermined interval upon termination of which, timing out of the timer closes switch arm ES2a, thus establishing a circuit through the relay R5 and moving switch arm R5b downwardly from the illustrated position to break the circuit to solenoid Vb1. This finally closes the end point control valve Vb if it was then open and marks the end of the cycle.

The probe 26 as seen in FIGURE 2, is housed in a highly thermally conductive metal cylindrical case 100 which contains one or more heaters 101 along with a thermostat 102, a probe tube 103 made of a highly thermally conductive metal or material, a center electrode conductor 104 which acts as a conductor as well as a tie rod to hold insulators 105 and 106 in place as well as holding the probe center electrode 107 in place. Cylindrical case 100 is surrounded by an insulating jacket 108 to minimize the heat loss of the cylindrical case 100. Attached to the probe tube 103 at the top is a flange plate 109 which acts as a surface for the air escaping out of orifice 110 to "plane" between the inner face of the flange 109 and the sand itself being pressed against the probe flange 109. Air is received from a supply line 110a where it is regulated by a pressure regulator 111a. Pressure may be regulated at a constant value within a range of 2 to 30 pounds per square inch. A pressure gauge 112 is installed in the down-pressure line 113 to indicate the down-pressure so that the pressure regulator may be adjusted manually by handle 111b. Also, in the down-pressure line a water trap 114 is provided to trap any water in the air system. The constant pressure regulated dry air is received into the probe at 115. Air is brought into the internal part of the probe where it is heated by physical contact with the probe tube 103 which is kept at constant temperature by the heater 101 and thermostat 102. The heated air from the inside of the probe tube 103 passes into a port located at 116 and passes on through a passage 117 until it is exhausted at the orifice located at 110.

As previously described, the maximum reading is taken at the time that the rollers 22 pass directly over the center electrode 107 pressing the sand between the roller 22 and center electrode 107. The sample of sand which is being measured lies between the center electrode 107 and the ground contact supplied by the probe tube 103. After the roller passes the center of the probe, the plow or plows 24 will remove all, or substantially all, of the pressed material from the surface of the probe. A new specimen of sand now drops onto the probe surface. Hot air escaping out of the orifice 110 is in the process of blowing through the new sand now on the probe surface. The hot air will be evaporating a small amount of water during the elapse of time between the passage of the plow until the roller again passes and presses the sand against the probe to obtain a maximum signal which is conducted through the center electrode 104 down to the connection 118 where line 50 of the coaxial cable 119 is connected. The coaxial cable will carry the signal to the inductance capacitance bridge through lines 50 and 52. The amount of moisture to be evaporated at the probe surface in the general area of the orifice 110 will vary directly according to the temperature of the sand and also directly as the pressure of the incoming air at the orifice 110.

Also, it should be understood that the amount of evaporation taking place in the general area of the orifice 110 will vary directly as the temperature of the air. The thermostat 102 may be set to control at a constant elevated temperature, preferably but not necessarily between 212 degrees and 600 degrees Fahrenheit.

The purpose of the above described probe is to modify the operation so that a measurement of the moisture content of the sand, compensated for anticipated loss of moisture during the interval between mixing and use, is obtained. The loss of moisture in the small specimen of sand where moisture content is measured at any instant is a function of the special characteristics of the sand such as particle size, character and quantity of clay and bonding material, and is also a function of the temperature and quantity or velocity of air emitted through the port at the probe. At a given temperature and velocity of air, the loss of moisture will of course be dependent upon the temperature of the sand.

A suitable range of air velocity or air pressure is contemplated, since variations in results obtained by different air flow may be compensated for in other places in the system. However, in general it is expected that the air supply to the probe will be between 1 and 6 pounds per square inch and preferably between 2 and 3 depending on the degree of compensation required and permeability of the sand.

Referring now to FIGURES 3 and 4 there is shown a modification of the probe which may be substituted directly for the probe of FIGURE 2 in the system illustrated in FIGURE 1. The probe comprises a central electrode 120 having a smooth flat specimen engaging contact surface 122. A tubular electrode 124 surrounds the central electrode 120 and provides a flat smooth annular specimen engaging contact surface 126. The end of the tubular electrode 124 adjacent the central electrode 120 is provided with a cylindrically enlarged chamber 128 which receives an annular insulator 130, the insulator having a smooth flat specimen engaging contact surface 132 disposed between and forming a continuation of contact surfaces 122 and 126. The probe includes a flange 134 having a smooth flat engaging contact surface 136 which forms a continuation of the electrode and insulator surfaces previously described.

The central electrode 120 is connected to a conducting assembly rod 138 which passes through a central opening 140 in the insulator 130 and which also passes through a central opening in a second insulator 142 located in a recess 144 at the opposite end of the tubular electrode 124. A nut 146 is threaded to the rod 138 and retains the parts in assembly as illustrated.

The insulator 130 includes a cylindrical recess 148 whose inside diameter is slightly larger than the outside diameter of the central electrode 120 and accordingly, there is defined between the insulator and central electrode and continuous annular passage 150 terminating in a port coplanar with the specimen contacting surfaces previously described. The insulator 130 is provided with a plurality of axially extending passages 152 communicating at their lower ends with the interior of the tubular electrode 124 and at their upper ends with the annular passage 150. The rod 138 is of smaller diameter than the inside diameter of the tubular electrode 124 and there is accordingly formed an air passage 154 extending longitudinally of the probe assembly. An air supply line 156 is provided through which air may be supplied by means similar to that shown in FIGURE 2, except that if desired heating means separate from the probe proper may be employed. Such heating means are diagrammatically suggested in FIGURE 3.

With this arrangement it will be observed that air is emitted through an annular port located between the central electrode 120 and the annular electrode 124. This air, being restrained by the mass of moist granular material in contact with the probe will spread out through the sand in contact with the probe, and to some degree will flow directly across the probe surfaces so as to effect practically instantaneous predetermined drying of the sand actually in contact with the probe.

A probe constructed in accordance with the disclosure of FIGURE 3 has been successfully operated having a central electrode, the exposed or sensitive area 122 of which is a circle having 5/8 inch diameter. The air gap is an annular port having a transverse width of 1/16 inch. The gap across which the capacitance or resistance is measured, or in other words the exposed surface of the insulator 130, is an annular surface having a transverse dimension of 3/16 inch, including the air gap. Under these circumstances it has been found that the air flow may vary from approximately ten cubic feet per minute with an air supply of two pounds per square inch, to approximately fifteen cubic feet per minute with an air supply at three pounds per square inch. Obviously, the volumetric flow of air will be determined in part by the permeability of the sand as well as whether the probe is being used in continuous uniform contact with moist granular material which has relative sliding motion across the probe, or whether the operation is an intermittent compression of the moist material against the surface of the probe.

Referring now to FIGURE 5 there is shown the application of the present invention to a system in which the granular material such as the sand shown at S is advanced along a conveyor 160. Adjacent the conveyor is a post 162 carrying a probe 164 which as shown in this figure is below the level of the granular material advanced along the conveyor. Accordingly, as the conveyor moves, the moist granular material is in continuous motion across the sensing surface of the probe. Obviously, if desired, the probe might be slightly inclined so that the advancing sand more directly engages the face of the probe. In this case the probe may be of the type shown in FIGURE 2 or 3, and is supplied with a continuous current of air through air supply line 166. The capacitance between the electrodes of the probe is sensed by mechanism including a coaxial cable 168 connected to an inductance capacitance bridge indicated by the circuit included within the broken line box 170. The output of the inductance capacitance bridge is fed to a balancing circuit including a potentiometer 192 connected across a battery 193 and also including a converter 174. The potential difference between the output of the inductance capacitance bridge and the potential across the potentiometer due to battery 193 causes a current to flow through converter 174 to cause a signal output therefrom which is fed through a transformer 176, a voltage amplifier 178, and a power amplifier 180 to a motor 182. Connected to the motor is a shaft 184 carrying a cam 186 which engages a diaphragm 188 movable toward and away from the exhaust port of an air line 190 for a purpose which will subsequently be described. Contactor 194a of potentiometer 192 is movable by rotation of the motor shaft. The shaft also connects to a pointer 195 movable over a dial. When a change in capacitance across the electrodes of the probe occurs, the potentiometer circuit is unbalanced and develops an output voltage which operates the motor 182 until changes in the potentiometer 192 rebalance the potentiometer circuit so that no current flows therein. This results in movement of the diaphragm 188 toward and away from the discharge port of the air conduit 190 which correspondingly varies the resistance to flow of air out of the line 190. This operates as a variable bleed for controlling air pressure in the system.

Air line 194 includes an air pressure regulator 197, air pilot valve 196, and an air gauge 198, and the air at the controlled pressure is supplied to the air pressure controlled water valve 200 which controls flow of water through the water line 202 to a sprinkler head 204. Thus, the rate at which water is added to the continuously advancing granular material is controlled by the measurement of the moisture content of the partially dried specimen in contact with the sensitive surface of the probe. In order that the quantity of water shall be directly dependent upon the opening of the valve 200, a water pressure regulator indicated at 206 is preferably included in the water line.

The water from the sprinkler head 204 is supplied to the sand as it advances through a continuous mixer 208 including rotating mixing and advancing paddles indicated at 210. The sand or other granular material is eventually discharged from a spout 212 onto a second conveyor 214 which advances the tempered sand for re-use.

Referring now to FIGURE 6 there is illustrated a similar arrangement to that shown in FIGURE 5 except that the probe 164 has its electrodes exposed at the underside of a sled 215 which is connected to the post 162 by a swinging arm 216. The sled thus rides upon the upper surface of the granular material S as the granular material is advanced.

In FIGURE 6A there is illustrated a modified arrangement in which the probe indicated generally at 164a is mounted on a sled 166a adapted to ride upon granular material such as sand shown at 168a as it is advanced in the direction of the arrow 170a by a conveyor belt 172a. In this case drying air is forced under pressure through an air line 174a through a port located at the under surface of the sled 166a in advance of the probe 164a, considering the relative motion between the probe 164a and the granular material 168a. Thus, the material which is to pass against the active surface of the probe is first subjected to a drying action at the interface between the underside of the sled and the granular material. Thus, when any particular specimen of granular material is acting against the surface of the probe, it will have had its actual moisture content reduced by the drying action of air admitted through the line 174a and this drying action will be a function of the temperature of the moist granular material.

Referring now to FIGURE 7 there is illustrated the application of the present invention to a mill 220 of somewhat different construction. In this case the mill includes rollers 222 and plows 224 which are rotatable by means of a shaft 226. The probe, indicated generally at 228, is located in the bottom wall of the mill in position to be traversed alternately by rollers 222 and plows 224. In this case water is added to the granular material in the mill through a line 230 discharging into a container 232 having a conical deflector 234 and leading to discharge pipes 236 including spray heads 238.

Referring now to FIGURE 8 there is shown the application of the invention of yet another type of mill in which the mill body 240 is mounted for rotation on a post 242 and is rotated by a motor 244 driving a gear or other drive element 246 in geared engagement with a ring gear 248. In this case rollers 250 are provided in a stationary position but allowed to roll on support shaft 252. Plows, one of which is indicated at 254, are provided in fixed position, herein shown as supported from the shaft 252. In this case since the body or container 240 of the mill rotates, the probe 256 is provided in a stationary position by adjustable support means indicated generally at 258. As shown in this figure the probe is slightly inclined so that the advancing sand engages the surface at an angle and sweeps across the sensitive surface. The probe is provided with an air supply pipe 260 and is connected by a coaxial cable 262 to a control or measuring system of the type previously described.

Referring now to FIGURE 9, the invention is shown as applied in a different manner to a mill 270. In this case the mill is provided with the rollers 272 and a plurality of plows one of which is indicated at 274. Water is admitted to the mill through suitable means indicated diagrammatically as a pipe 276. In this case the probe is illustrated at 278 and is carried by the shaft 280 carrying the rollers 272. Accordingly, the electrodes of the probe are moved across the upper surface of the sand or through the sand as the shaft 280 rotates. Since the probe rotates the air supply passage 282 includes a rotating ball joint 284 and the coaxial cable 286 requires a brush connection diagrammatically indicated at 286.

In this case the probe 278 may if desired be inclined to expose its sensitive contact surfaces in the direction of rotation. Also, it may if desired, be mounted on a sled for rotation over the upper surface of the moist granular material, or set to move beneath the surface thereof.

Referring now to FIGURE 10 there is illustrated the application of the invention to yet another type of mill which comprises a container 290 in which rollers 292 and 294 are rotatable on their own axes and are revolved on a large turret 296. In this case the probe 298 has its electrodes exposed in a side wall of the mill 290 in a position such that passage of the rollers 292 compress specimens of moist granular material against the exposed surface of the probe. The addition of water in this case is through a pipe 300 leading into the bottom wall of the mill.

Referring now to FIGURE 11 there is shown an application of the present invention to a system in which the compensated moisture reading is shown on an indicator 302 and the control of the addition of water is left to manual operation of a water valve. In this case the connections to the moisture probe are shown at 304.

Electrical energy from a source (not shown) which may be 110 volts, 60 cycle alternating current, is delivered to a constant voltage transformer 305 and onto the transformer 306 wherein it is stepped down to a regulated 40 volts for example, before being applied to resistive probe 307 over conductors 308 and 310 through fuse 312 and resistor 314. This electrical energy applied to probe 307 through resistor 314 will produce a voltage drop across resistor 314 the magnitude of which will depend on the resistance value of the probe 307 since the probe and resistor 314 are in series across transformer 306. A portion of the voltage developed across resistor 314 is tapped therefrom through conductors 316 and 318 and is then rectified in rectifier 320 and is delivered to the indicator 302 over conductors 324 and 326 to produce a reading thereon which is directly proportional to the voltage drop across resistor 314, inversely proportional to the resistance of probe 307, and therefore directly proportional to the moisture content of the sand in which the probe 307 is positioned. When properly calibrated the indicator 302 will thus indicate sand moisture content direct. Resistors 328 and 330 are provided in parallel and series respectively with the indicator 302 to permit coarse and fine adjustment of the voltage applied to the indicator to compensate for the different resistive values or sand factors of different kinds of sand containing an equal amount of moisture. Resistor 322 in conjunction with capacitors 334 and 336 provides variable damping for the rectified signal from rectifier 320 to stabilize the reading of indicator 302.

Figure 12:
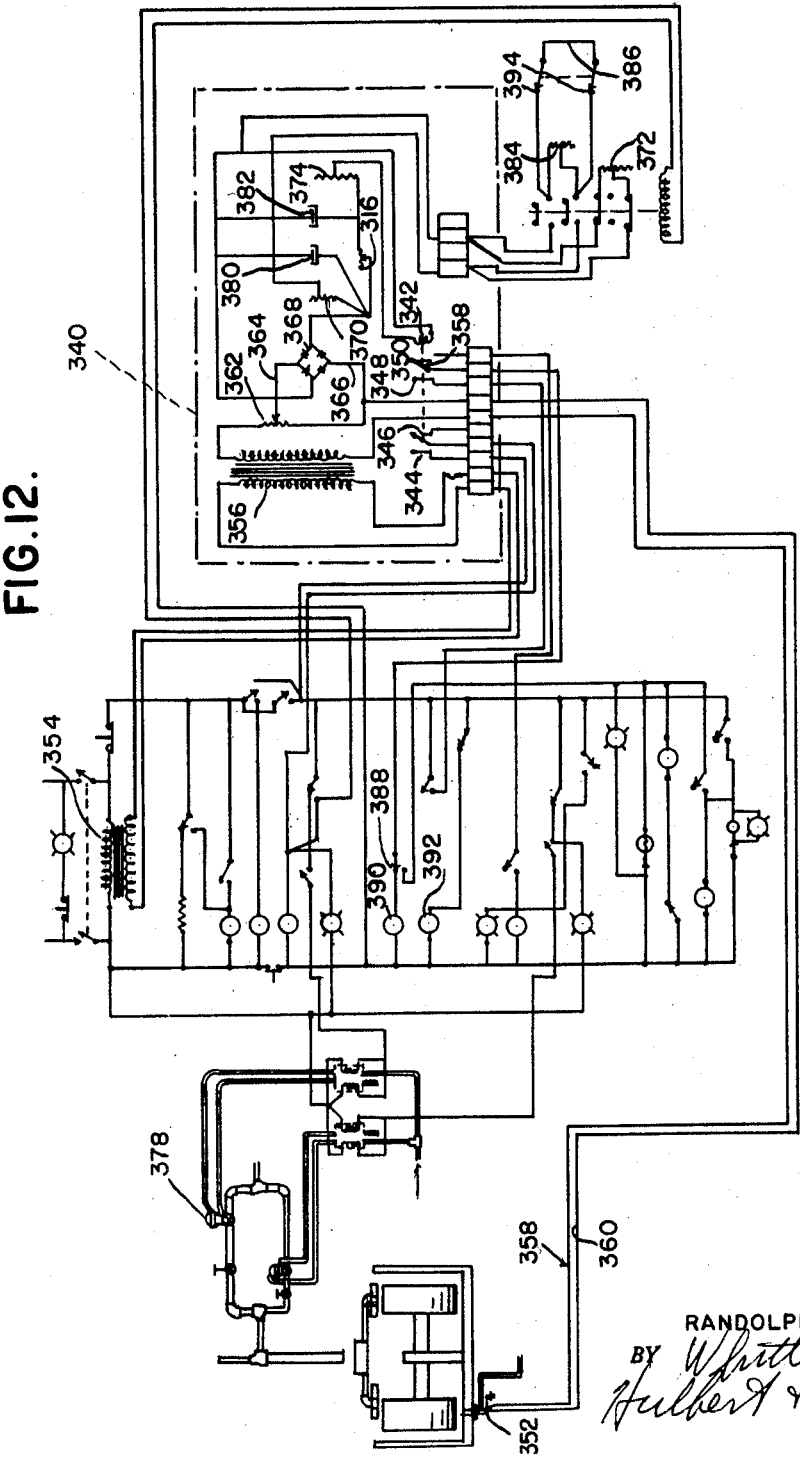
FIGURE 12 is a wiring diagram showing an application of the invention to a system employing electrical resistance.

Referring now to FIGURE 12, there is shown an application of the present invention to a system in which the compensated moisture is controlled by a resistance sensing bridge 340 in conjunction with a current sensitive relay 342 which will actuate switches including contacts 344, 346, 358 and 350 to sequence a control circuit as previously described for FIGURE 1 with the exception that all variables in the measuring circuit will be resistance values instead of capacitance values. In this case the connections to the moisture probe are shown at 352.

Electrical energy from a constant voltage transformer 354 supplies 110 volt, 60 cycle alternate current to a step-down transformer 356 to deliver 40 volts for example, before being applied to the resistance gap probe 352 by conductors 358 and 360 and resistor 362. This electrical energy applied to the probe 352 and to the resistor 362 will produce a voltage drop across resistor 362. The magnitude will depend upon the resistance value of the probe 352 since the probe and the resistor 362 are in series across transformer 356. A portion of the voltage developed across resistor 362 is tapped therefrom through conductors 364 and 366 and then is rectified in rectifier 368 and is delivered in a proportion to relay 342 depending upon the set values of resistors 370, 372, 374 and 376 to close off valve 378 when the moisture at probe 352 is of a resistance value sufficient to conduct current through the resistance sensing bridge 340 to energize relay 342 which in turn will close valve 378.

Electrolytic condensers 380 and 382 are used as filter condensers to stabilize the flow of current in resistance sensing bridge 340. At the time that relay 342 is energized for a brief interval the system is arranged at this time to close large capacity first point valve 378 and to shift the control of the instrument to the combination of the end point resistor 384 and calibrated resistors 362, 370, 374, and 376 along with jumper 386 to short cut the value of resistor 384, thus giving the total equivalent resistance of the resistance sensing circuit 340 its lowest value which in turn will allow relay 342 to de-energize causing relay arm 388 to engage contact 350 and complete a circuit through contact 388 to energize relays 390 and 392, thus taking parallel short 386 out of the circuit at contact 394 for the remainder of the cycle leaving the control of the resistance sensing bridge 340 to the sum of the end point resistors 384, 374, 376, 370 and 362. The control circuit will sequence hereafter in the same manner as described for FIGURE 1 with the exception that the control variables are resistance values instead of capacitance values.

It is recognized in all of the embodiments of the invention previously described that the drying effect of the air introduced in the vicinity of the probe is of course dependent upon the time interval in which it exerts its drying effect.

Referring now more specifically to FIGURE 7A there is illustrated mechanism which permits a control of the effective drying interval. In this figure there is associated with each of the rollers 222 of the mill 220 a pre-compression roller 221 which is mounted to precede the roller 222 and to impart a predetermined compression to a sand specimen overlying the probe a definite time interval ahead of the passage of the relatively heavy roller 222 thereover. As shown, the roller 221 is mounted on an arm 223 pivoted to an arm 225 which is rotatable on the shaft 227 which carries the roller 222. A coil spring 229 is provided, one end of which is carried by an adjustable collar 231, the other end overlying the arm 225 to impart a predetermined downward force to the pre-compression roller 221. Adjustment of the roller 221 toward and away from the roller 222 provides for a control of the interval in which the pre-compressed sand is subjected to the drying action of the air at the probe. Adjustment of the collar 231 provides for adjustment of the amount of compression imparted to the sand by the pre-compression roller 221.

The drawings and the foregoing specification constitute a description of the improved method and apparatus for taking a measurement of compensated moisture content of granular material in such full, clear, concise and exact terms as to enable any person skilled in the art to practice the invention, the scope of which is indicated by the appended claims.

What I claim as my invention is:

1. The method of obtaining a compensated measurement of the moisture content of moist granular material which comprises providing a probe having a pair of spaced electrode surfaces positioned in the bottom wall of a mill in position to be driven alternately by a roller and a plow effective to remove granular material from the surface of the plow, providing a continuous flow of drying air through granular material deposited on the probe following passage of the plow, compressing the partially dried granular material against the surface of the probe by the roller, and measuring an electrical condition dependent on moisture content of the granular material between the electrodes.

2. Apparatus for controlling the compensated moisture content of moist granular material which comprises a support for a body of moist granular material, a probe having spaced electrodes in its surface in contact with granular material carried by said support, said probe including a port adjacent said electrodes, means for supplying a continuous flow of drying air through said port and through the granular material adjacent and between said electrodes, means for heating the air, and means for maintaining the pressure and temperature of air supplied to said port at a constant value.

3. Apparatus as defined in claim 2 which comprises means for measuring an electrical condition dependent upon moisture content of the granular material between said electrodes as a measure of compensated moisture content of the bulk of granular material.

4. Apparatus as defined in claim 2 which comprises means for measuring an electrical condition dependent upon moisture content of the granular material between said electrodes as a measurement of compensated moisture content of the bulk of granular material, and means responsive to the valve of the said electrical condition for controlling the addition of water to the granular material.

5. Apparatus for measuring the compensated moisture content of granular material which comprises means for supporting a body of moist granular material, a probe having spaced electrodes in contact with the granular material, means for pre-compressing a specimen of granular material against the surface of the probe, means for thereafter subjecting the portion of the pre-compressed granular material in contact with the probe to a flow of drying air for a predetermined interval, means for thereafter effecting a further compression of the granular material against the probe, and means for measuring the moisture content of the partially dried granular material at the instant of compression against the probe.

6. Apparatus as defined in claim 5 comprising means for adjusting the interval between pre-compression of the specimen and the final compression thereof.

7. Apparatus as defined in claim 5 which comprises adjustable means for varying the amount of pre-compression of the granular material against the probe.

8. A conditioning system for moist granular material comprising a mixer having a moisture probe in a bottom wall thereof, said probe comprising a pair of spaced electrodes exposed in said bottom wall for contact with material in said mixer, a roller and plow movable over said bottom surface in alternation to compress specimens of granular material against the electrodes and to remove them preparatory to receiving a new specimen for compression thereagainst, means for providing a continuous flow of drying air through only that portion of the granular material between and adjacent said electrodes, means for measuring an electrical condition dependent on the moisture content of the granular material between said electrodes as an indication of the moisture content of the remaining quantity of granular material compensated for anticipated evaporative losses due to its temperature, and means responsive to the measured electrical condition to control the addition of water to granular material in said mixer.

References Cited by the Examiner
UNITED STATES PATENTS

| | | | |
|---|---|---|---|
| 1,711,574 | 5/29 | Miller | 34—46 XR |
| 1,888,508 | 11/32 | Wierk. | |
| 2,045,381 | 6/36 | Elberty | 34—1 XR |
| 2,217,626 | 10/40 | Strang | 324—65 |
| 2,373,846 | 4/45 | Olken | 34—48 XR |
| 2,553,754 | 5/51 | Dietert et al. | 324—65 |
| 2,768,629 | 10/56 | Maul | 324—61 |
| 2,886,868 | 5/59 | Dietert et al. | 324—65 X |
| 2,940,040 | 6/60 | Rosenthal | 324—61 |
| 2,985,825 | 5/61 | Whittier | 324—61 |

NORMAN YUDKOFF, *Primary Examiner.*

CHARLES O'CONNELL, *Examiner.*